Oct. 26, 1965  C. S. BROWN  3,213,517
GLASS COATED MEMBER
Original Filed Jan. 2, 1962

INVENTOR.
CARL S. BROWN
BY Andrus & Starke
ATTORNEYS

United States Patent Office 3,213,517
Patented Oct. 26, 1965

3,213,517
GLASS COATED MEMBER
Carl S. Brown, Cleveland, Ohio, assignor to A. O. Smith Corporation, Milwaukee, Wis., a corporation of New York
Original application Jan. 2, 1962, Ser. No. 163,641, now Patent No. 3,156,033, dated Nov. 10, 1964. Divided and this application Mar. 4, 1964, Ser. No. 355,143
4 Claims. (Cl. 29—130)

This is a division of application Serial No. 163,641, filed Jan. 2, 1962, now Patent No. 3,156,033 granted Nov. 10, 1964.

This invention relates to a glass coated tubular member and particularly to an improved fused glass-coated tubular member.

Tubular members have been internally and externally glass coated by applying a suitable glass frit to the surface to be coated and then supporting the member in a firing furnace to increase the temperature or to fuse the glass frit to the member. However, in fusing of the glass to the tubular member, generally a substantial amount of furnace distortion or warping results. In certain applications, the degree of warpage must be highly minimized in order to provide a satisfactory use of the glass-coated roll.

This invention is particularly directed to a glass coated thin walled metal shell which is supported by a separable cylindrical core member. The core member is inserted inside the metal shell and causes it to assume a true cylindrical configuration. As employed herein, glass is generally synonomous with vitreous enamel and the like. The present invention is particularly directed a composite, glass coated insulating roll for use in processing of cellophane film.

Cellophane film will not generally accept or retain printing unless the surface is oxidized. Conventionally, the cellophane surface is subjected to high voltage discharge which oxidizes the surface slightly. In practice, the discharge takes place as the cellophane passes over a roller having an insulating outer coating and under the discharge bar of a high voltage source. Commercially glass of a proper thickness to withstand 20,000 volts is the most practical insulating coating for the outer surface of the roller. All other coatings which have been suggested have been found to separate from the roller.

As previously noted, glass coating of rollers in a furnace or the like results in a substantial distortion and generally is so severe as to make the device unsuitable for such applications. The present invention is directed to a composite, glass coated roller which includes a core member and a flexible glass coated sleeve which minimizes the furnace warpage to a level which permits the production of the conventional high discharge roll for cellophane processing or the like.

Generally, the present invention employs a laminar roller having a thin outer shell to which the glass coating is applied and an inner supporting and distortion eliminating core.

In accordance with the present invention the relatively thin-wall tubular shell is covered with a suitable glass frit or the like and supported in a vertical position within a furnace on a special alloy rack. Generally, the rack member includes a plurality of axially spaced spacer rings of a slightly smaller diameter than the internal diameter of the shell such that the tube can be rotated on the alloy rack.

After a fused glass coating is built up on the shell to the desired thickness, the assembly is removed from the furnace and a relatively heavy wall tubular liner or core is forced into the thin-wall shell and forces the latter out to a substantially true round form. Generally, it has been found desirable to provide a lubricating material on both the internal surface of the tubular shell and the exterior surface of the core.

Applicant has found that the glass follows the outward movement of the tubular shell without separation of glass from the shell if the yield point of the steel is not exceeded. It appears that the assembly takes advantage of the limited flexibility of the glass to adjust itself to the pressure exerted by the inner core as it is forced through the outer tubular wall.

The present invention thus provides a glass coated tubular member with substantial elimination of the warpage caused during the fusion of the glass coating to the surface of the tubular member.

The drawings furnished herewith illustrate the best mode presently contemplated for carrying out the invention.

Figure 1:
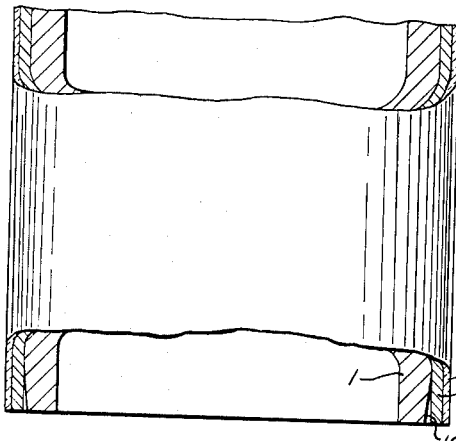
FIG. 1 is a fragmentary view of a finished tubular roll or member.

Referring to the drawings and particularly to FIG. 1, a glass coated tubular roller constructed in accordance with the present invention is illustrated and includes an inner tubular core 1 of a relatively substantial thickness and an outer thin-wall tubular shell 2 telescoped with the inner core 1. Whereas the inner core 1 is generally a heavy self-supporting member, the thin-wall shell 2 is a substantially non-self-supporting member. As applied to an insulating discharge roller for cellophane processing, the wall thickness of the outer shell may be about .0005 inch and the core about one inch.

A glass coating 3 is fused to the outer exterior surface of the thin-wall shell 2 to provide an insulating surface over which the cellophane film, not shown, is passed.

Figure 3:
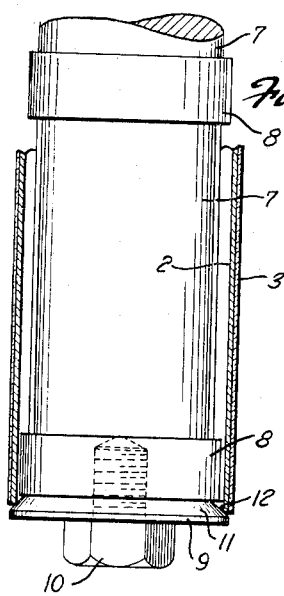
FIG. 3 is an enlarged fragmentary view of FIG. 2.
Figure 2:
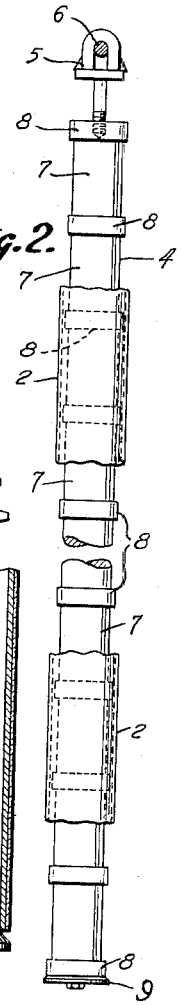
FIG. 2 is an elevational view of a tubular roll secured to a hanger within a furnace for fusing of a glass coating thereto.

Referring to FIGS. 2 and 3, the tubular shell 2 is mounted for glass coating as follows.

A cylindrical rack 4 of a somewhat greater length than the shell 2 includes a top hanger 5 by which the rack is secured to a suitable hook or rod support 6 and supported within a suitable furnace or the like, not shown. The thin-wall shell 2 is carried by the rack 4 in a position for fusing of a glass frit or the like thereto.

The rack 4 includes a series of alternate supporting shafts 7 and locating or spacer rings 8 which are interconnected in axial end-to-end relation as by butt welding or the like. Shafts 7 and rings 8 are solid and formed of a stainless steel alloy or the like which are not distorted by the temperature employed in firing the coating 3. The diameter of the spacer rings 8 is slightly greater than that of the shafts 7 and slightly less than the internal diameter of the thin-wall shell 2, as most clearly shown in FIG. 3. This clearance provides ease of assembly and disassembly of the shell 2 with respect to rack 7 even at elevated temperatures.

A supporting disc 9 is bolted as by a bolt 10 or otherwise secured to the lowermost spacer ring 8. The outer edge of the disc 9 is tapered as at 11 and extends or diverges radially outwardly of the adjacent ring 8 to present the tapered edge to the lower end of the thin-wall shell 2. The inner edge 12 of the thin-wall shell 2 rests on the tapered edge 11 and supports the shell 2 on the inner edge thereof during the fusing of the glass coating. Any glass which flows downwardly will not be collected on the disc as may occur with a straight ledge. This eliminates a possible cause of spalling or breaking away of the glass at the edge of shell 2.

Figure 4:
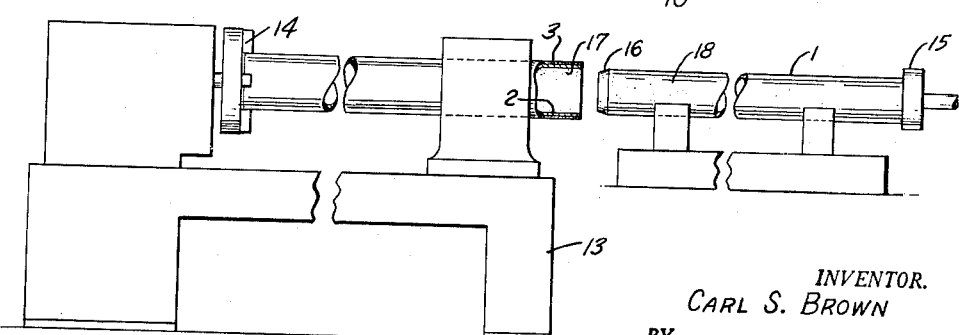
FIG. 4 is an elevational view illustrating the forcing of an inner core into a glass coated tubular shell with parts broken away to diagrammatically illustrate the lubrication of the parts.

After a sufficient thickness of glass has been fused to shell 2 to form the desired coating 3, the glass-coated tubular shell 2 is removed from the furnace and placed in an assembly machine 13 as shown in FIG. 4.

The illustrated machine 13 is generally a lathe type unit adapted to support the glass-coated shell 2 for axial alignment with the inner core 1. A stop 14 is secured abutting the one end of shell 2 with the opposite end adjacent core 1. A ram 15 is secured to core 1 and is moved axially to force core 1 into shell 2.

The core 1 is machined to an outer diameter slightly smaller than the inside diameter of shell 2 and preferably to provide a .0020 to .0025 inch clearance. The end of the core 1 immediately adjacent the end of the shell 2 is also provided with a slight taper 16 to center core 1 with shell 2 during the initial movement of the core into the shell 2.

Assembly is also desirably facilitated by applying to the mating surfaces of the core 1 and the shell 2 a suitable lubrication 17 and 18 of white lead in oil or any other suitable medium.

The core 1 is pressed into the shell 2 and forces the shell 2 to an essentially true cylindrical round exterior configuration.

The core 1 may be forced into the shell 2 with the shell either hot or cold.

Applicant has constructed 3½ inch diameter rollers in lengths up to 78 inches with the finished roller run-out well within the .060 inch tolerance which has been required as a minimum for cellophane processing applications and the like. Generally, the apparatus constructed had an internal diameter of 2.875 and a finished outer diameter tolerance lying between 3.580 and 3.620 inches. The glass-fired shells 2 employed had a run-out of as much as 0.120 inch. This was reduced after assembly with the machined inner core 1 to 0.040 inch and thus completely satisfactory for the highest commercial standard presently employed in the cellophane processing industry.

The present invention employs the restricted flexibility of the glass coating 3 to allow limited movement of the shell 2 and elimination of distortion.

Figure 5:
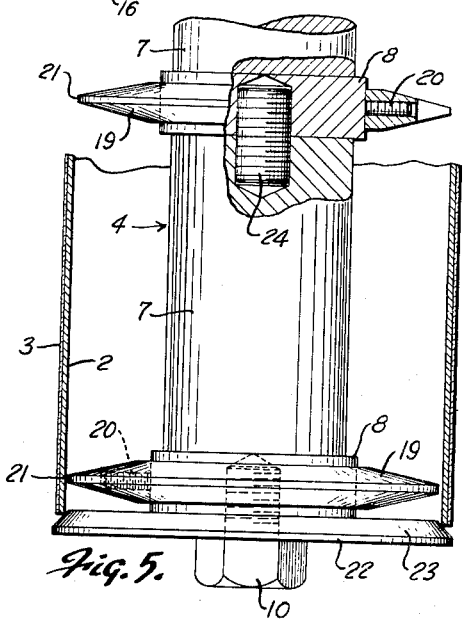
FIG. 5 is a fragmentary view similar to FIG. 3 illustrating the invention applied to the glass coating of a somewhat larger diameter tubular shell.

Referring particularly to FIG. 5, a view similar to FIG. 2, the rack 4 is illustrated with an increased diameter shell 2 mounted in place for firing a glass coating thereto. Generally, corresponding elements in FIG. 5 and FIGS. 2 and 3 are similarly numbered for simplicity and clarity of explanation. Additional spacer rings 19 are concentrically secured to the spacer rings 85 by recessed and circumferentially spaced set screws 20 or the like. The edges of rings 19 are tapered to provide a small locating surface 21 adjacent the shell 2. Rings 19 are also formed to provide clearance between surfaces 21 and the shell 2.

An enlarged supporting disc 22 is secured to the bottom spacer ring 8 and includes a tapered edge 23 aligned with the lower end of the shell 2. The supplemental spacer rings 19 increase the flexibility for the firing fixtures while maintaining expense at a minimum.

To provide for shells 2 of varying length, the lowermost shafts 7 and rings 8 can be made as a subassembly and secured in place with a suitable stud 24 having threads corresponding to the bolt 10 as shown in FIG. 5.

The present invention thus provides a glass coated roller having a minimum of run out.

Various modes of carrying out the invention are contemplated as being within the scope of the following claims particularly pointing out and distinctly claiming the subject matter which is regarded as the invention.

I claim:
1. A glass coated tubular member for electrostatic processing comprising,
    (a) a tubular supporting core which is completely self supporting and has a true cylindrical outer surface, said core having a wall thickness of approximately one inch,
    (b) a thin metal tubular shell telescoped over the core and having a wall thickness of approximately .0005 inch and permitting flexible movement of the shell, and
    (c) a glass coating fused to the exterior surface of the thin-wall shell.
2. The glass coated tubular member of claim 1 wherein said roller is designed to have an outer diameter of essentially 3½ inches within a tolerance of .060 inch.
3. A glass coated tubular member for electrostatic processing comprising,
    a supporting core which is completely self supporting and has a true cylindrical outer surface,
    a thin metal tubular shell telescoped over the core and having a wall thickness of approximately .0005 inch and permitting flexible movement of the shell, and
    a glass coating fused to the exterior surface of the thin-wall shell.
4. A glass coated tubular metal member for use in electrostatic processing comprising,
    a self-supporting core having a generally true cylindrical outer surface,
    and a thin walled metal shell having a glass coating fused thereon adapted to be telescoped over said core, said metal shell and said glass coating having a flexibility permitting movement of the shell to a true cylindrical round exterior from a slightly non-cylindrical configuration without exceeding the yield point of the metal or the glass coating when in final telescoped position on said core, whereby said glass coated metal shell conforms to the true cylindrical shape of said core when mounted thereon without any spalling of the glass.

References Cited by the Examiner

UNITED STATES PATENTS 1,394,684    10/21    Matsuo.
1,619,371    3/27    Rogers et al.

WALTER A. SCHEEL, *Primary Examiner.*

LOUIS O. MAASSEL, *Examiner.*